April 10, 1951      E. B. WAGNER      2,548,084
SCOOP-SHOVEL VEHICLE

Filed Sept. 19, 1947      4 Sheets—Sheet 1

INVENTOR.
Eddie B. Wagner
BY
Attorney

April 10, 1951  E. B. WAGNER  2,548,084
SCOOP-SHOVEL VEHICLE

Filed Sept. 19, 1947  4 Sheets-Sheet 2

INVENTOR.
Eddie B. Wagner
BY
Attorney

April 10, 1951  E. B. WAGNER  2,548,084
SCOOP-SHOVEL VEHICLE
Filed Sept. 19, 1947  4 Sheets-Sheet 3

INVENTOR.
Eddie B. Wagner
BY
Attorney

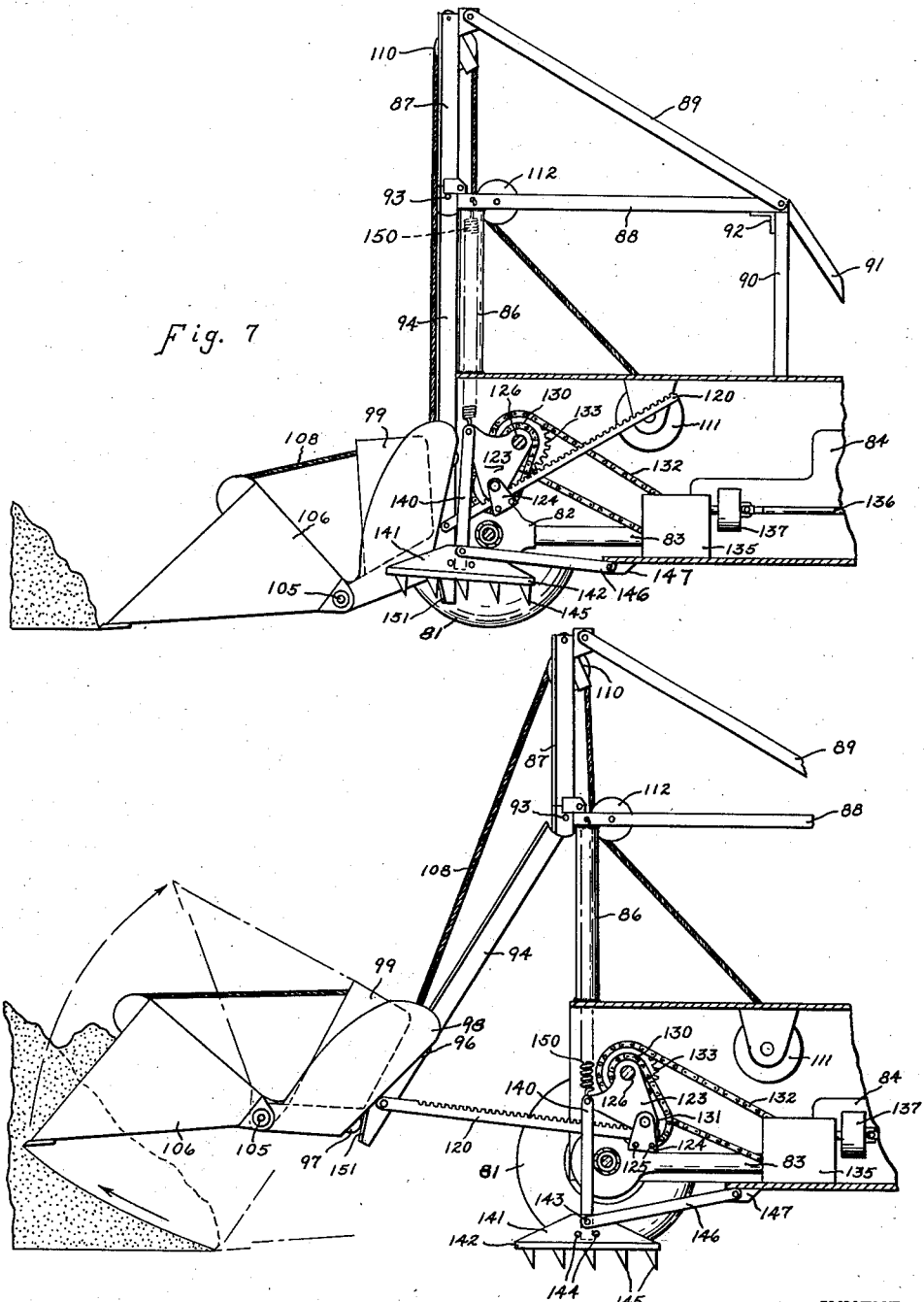

Patented Apr. 10, 1951

2,548,084

UNITED STATES PATENT OFFICE 2,548,084

SCOOP-SHOVEL VEHICLE

Eddie B. Wagner, Portland, Oreg.

Application September 19, 1947, Serial No. 775,089

7 Claims. (Cl. 214—120)

My present invention relates to automative scoop vehicles and means for insuring the filling of the scoop of a material handling scoop mechanism, the invention being disclosed in connection with a scoop vehicle of the type disclosed and claimed in the co-pending application of Harold A. Wagner and Eddie B. Wagner, Serial No. 716,696, filed December 17, 1946, and now Patent No. 2,538,400, granted January 16, 1951, and having features thereof modified to include portions of the mechanism disclosed and claimed in the co-pending application of Elmer A. Wagner, Serial No. 756,224, filed June 21, 1947, and now Patent No. 2,503,180, granted April 4, 1950.

The principal object of the present invention is to provide means whereby a scoop may be completely filled at each scooping movement thereof. It is well known that when using ordinary scoop mechanisms the scoop may appear to be fully loaded when in proximity to the pile of material being transported, but when the scoop is lifted from the pile of material most of the material which appeared to be in the scoop falls back onto the ground. It is an object of my invention to so arrange a scoop operating mechanism that a full load is assured at each scooping movement.

A further object of the present invention is to provide means whereby a mobile or automotive scoop may pick up a full load at each scooping movement without the necessity of ramming or bucking the scoop into the pile of material. The present invention comprises a scoop device which not only may be elevated or lowered, and not only may be moved from material holding position to dumping position, but which is movable forwardly into the base of a pile of material while the vehicle or supporting structure to which the scoop is attached remains stationary. A further object of the present invention therefore is to prolong the life of an automotive scoop vehicle by eliminating any necessity for subjecting the mechanism to severe shocks and strains such as would be occasioned by ramming or bucking the scoop into a pile of material.

A further object of the present invention is to provide a scoop which may be lowered to the ground in scooping relation to a pile of material and then moved into the material while the cutting edge of the scoop remains closely adjacent the ground level. Many prior art devices include a scoop or bucket which may be swung into the base of a pile of material but all such devices include means whereby the cutting edge of the scoop travels upwardly along an arcuate path, with the result that the scoop is not always filled with material since the cutting edge soon moves out of the pile of material. An advantage of the present invention is that, if desired the scoop may be so handled as to move the cutting edge through an arcuate path, but normally the cutting edge of the scoop moves in a lineal path parallel to the ground, or at least in a path such that the cutting edge remains close to the ground, during the operation of entering the material.

A further object of the present invention is to provide an automotive scoop having the foregoing advantages of which all parts are sturdy and rugged, and may be economically manufactured of readily procurable materials and parts.

A further object of the invention is to provide an automotive scoop vehicle with means for insuring that the vehicle may remain stationary while the scoop is being extended into the material to be scooped.

The objects and advantages of the present invention will be more readily apparent from an inspection of the following specification taken in connection with the accompanying drawings wherein like numerals refer to like parts throughout, while the features of novelty will be more distinctly pointed out in the appended claims.

In the drawings

Fig. 7 is a vertical section on a reduced scale taken substantially along line 7—7 of Fig. 6;

Fig. 8 is a view similar to Fig. 7 showing the mechanism in a different operating phase.

Figure 1:
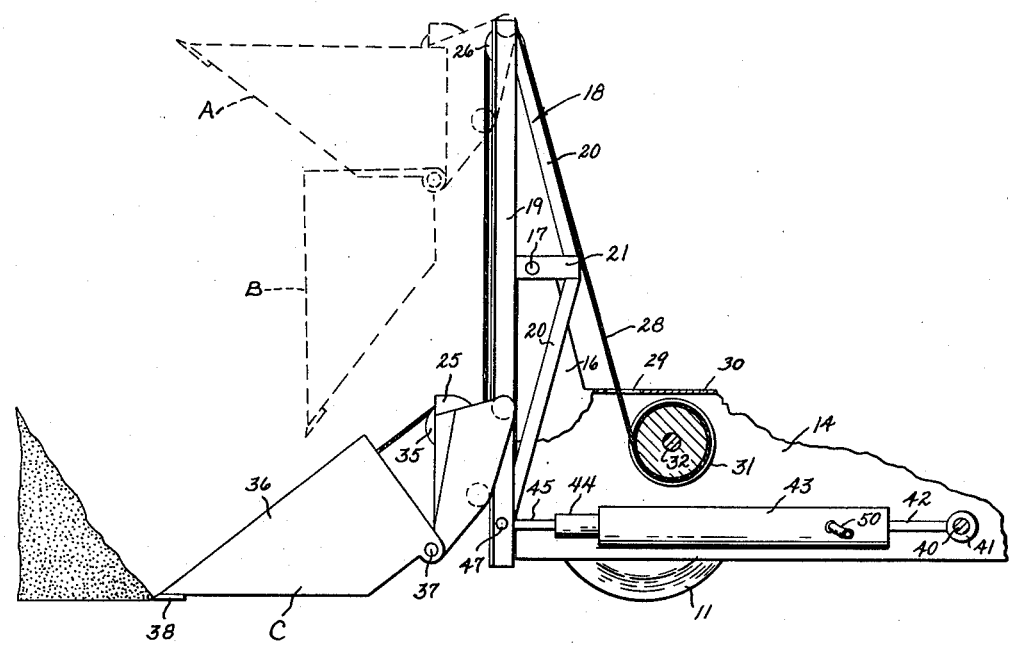
Fig. 1 is a partial view taken substantially along line 1—1 of Fig. 3, showing a vehicle with a scoop in full lines in position to commence a scooping operation, and in broken lines when in elevated, material holding and dumping positions.

A vehicle similar to that shown in Figs. 1 to 4 such as could be utilized for the present invention is more particularly illustrated in the aforementioned application, Serial No. 716,696, the vehicle comprising forward, spaced wheel assemblies 10 and 11 and a rear steering wheel (not herein illustrated). Preferably the vehicle is modified somewhat similar to the vehicle disclosed in the above identified application, Serial No. 756,224, so that the forward wheel assemblies 10 and 11 are supported upon short driving shafts 12 and 13, respectively, which are journaled in longitudinally extending hollow frame members 14 and 15, through which extend driving means from a rearwardly located transmission and differential mechanism (not shown). Such driving mechanism is not herein illustrated since it is extraneous to the present invention and mechanism of the preferred type may be readily incorporated in a vehicle after studying the disclosure of the aforementioned application, Serial No. 756,224. Also, various other types of vehicles may be utilized and have incorporated thereon the mechanism of the present invention.

At the forward corners of the frame portions 14 and 15 there are provided a pair of vertically extending trunnion cradles 16, only one of which is herein illustrated, it being obvious that the other may be identical. At the upper ends of the trunnion cradles 16 trunnions 17 are provided which support a rocking frame 18 including a pair of vertical L-beam tracks 19. Suitable bars 20 extend from the ends of each L-beam 19 to the free end of a central king post 21 in which the trunnion 17 is journaled. The short legs of the L-beams 19 lie in a substantially vertical plane parallel to the front of the vehicle and point outwardly to provide tracks upon which opposed pairs of carriage wheels 22 and 23 are guided. The wheels 22 engage the rear surfaces of the guiding flanges and the wheels 23 engage the front surfaces thereof, the wheels 22 being located above the wheels 23 and both being mounted upon side plates of a scoop supporting carriage 25. The upper end of the frame 18 supports cable guiding means such as pulley 26, there being a pair of such pulleys, one for the reception of a carriage hoisting cable 27, and the other for the reception of a scoop controlling cable 28. The cable 28 passes downward through an opening 29 in a horizontal deck plate 30 and is wrapped about a drum 31 mounted upon a shaft 32 extending between the frame portions 14 and 15; while the cable 27 passes through a similar opening 33 in deck plate 30 and is wound about a drum 34 also mounted upon the shaft 32. As disclosed in the above identified application Serial No. 716,696, the cable 27 may be attached to the upper end of the carriage 25 while the cable 28 passes about guiding means on the carriage including pulley 35 and is then attached to the upper edge of the rear wall of a scoop 36 pivoted to the carriage on pintles 37 adjacent the lower rear corners of the scoop. The forward edge of the scoop is preferably provided with a cutting blade 38 to facilitate entry of the scoop into the piled material.

The operation of the carriage and control of the scoop will be more fully understood by reference to the aforesaid application, Serial No. 716,696, wherein it is disclosed that the cable 27 may be operated independently of the cable 28 to hold the carriage at any position along the vertical members 19 or permit its descent by gravity. Also, at any point in the travel of the scoop along the members 19 the cable 28 may be controlled or operated to hold the scoop 36 in a material holding position such as illustrated at A, or to release the scoop so that it falls by the force of gravity to a material dumping position, such as illustrated at B, or to scooping position such as illustrated at C. As seen in Fig. 1, cable 27 has been released until the carriage 25 has moved toward the lower end of the members 19 and the cable 28 has been released so that the sloping front side of the scoop 36 rests upon the ground. With the scoop in such position the vehicle may be driven forward until the scoop has substantially entered the pile of material. If this is done gently without ramming or bucking the pile a partial load of material could be elevated by manipulating cable 28 to cause the scoop to assume the material holding position. As explained in the aforesaid application, Serial No. 716,696, when the cable 28 is wound upon the drum 31 the first result will be to raise the scoop to a vertical position, but as soon as the back wall of the scoop contacts the front wall of the carriage continued winding movement of the drum 31 causes the carriage to move upward along the tracks 19.

In the modification of Figs. 1 to 4 a full load is assured at each operation of the scoop by the following mechanism. A pivot bar 40 extending between the frame portions 14 and 15 supports a tubular member 41 to which is welded a triangular plate 42 having a truncated forward extremity which is welded to the rear end of a cylinder 43. A piston 44 extending from the forward end of the cylinder 43 is welded to the rearwardly pointing truncated end of a triangular plate 45, the forward edge of which is welded to a tubular member 46 journaled upon a pivot rod 47 extending between the lower ends of the track members 19. A tube or pipe 50 extends from the rear end of the cylinder 43 into the hollow frame portion 15 through an opening 51 and is connected to a valve 52 including a valve stem 53 connected to a flexible cable 54 extending from some point on the vehicle accessible to the operator thereof. The valve 52 communicates with a second tube 55 connecting with a return tube 56 extending through an opening 57 and leading to a fluid storage tank (not herein illustrated). The inlet end of the valve is connected by a tube 58 to the outlet side of a fluid pump 60 having an intake tube 61 which extends through an opening 62 into the storage tank. The pump 60 is operated by a shaft 65 having a pulley 66 thereon about which extend belts 68 passing through an opening 69 and about driving means such as pulleys on the automotive vehicle engine crankshaft (not shown). Tubes 56 and 58 are connected through a by-pass including a pressure relief valve 70 which may be set to open at any desired pressure. The details of the valves 52 and 70 are not herein illustrated inasmuch as many valves of suitable type are well known to those skilled in the art.

The operation of the hydraulic mechanism is as follows: When the scoop has been driven into the material as far as possible without straining any portion of the mechanism the vehicle is arrested and the cable 54 pulled to cause the output of the pump to flow through tube 50 into cylinder 43, thereby extending the piston 44 and causing the frame 18 to rock about the trunnion pivots 17. When the piston 44 has reached the forward extent of its movement the pressure in the system will build up to such an extent that relief valve 70 will open and cause the fluid to return to the storage tank. The relief valve is set to open at such a pressure that the scoop may be retained in a forwardly achieved position. If the cable 54 is now released to permit valve stem 53 to return to its normal position the tube 50 will be disconnected from the output side of the pump and the tube 55 will be connected thereto so that the pump forces the fluid directly into the storage tank. A third connection from the valve 52 is simultaneously opened to permit drainage of the fluid from the interior of the cylinder 43 to the storage tank (such connection not being herein illustrated).

In the preferred operation of the device the scoop is first positioned as illustrated at C. The hydraulic cylinder is then operated to move the scoop to the position illustrated at D. Thereafter and while the cylinder is still extended the cable 28 may be wound upon drum 31, first to move the scoop to the position illustrated at E and then to elevate the scoop and carriage along the tracks 19. While the carriage is traveling upward, or before it starts to move upward, the cable 54 may be released to cause the frame 18 to swing back to the vertical position. The weight of the scoop, empty or loaded, is sufficient to cause counterclockwise rocking of the frame 18 to its normal, vertical position. Should the operator fail to release the cable winding mechanism before the carriage reaches the top of the frame 18 the frame may swing clockwise only to the extent permitted by the piston 44. Preferably, however, a safety device is incorporated to stop the winding drum 31 and lock the holding drum 34 when the carriage reaches a predetermined maximum height. Such a safety device (not herein illustrated) is fully described and shown in the aforesaid application Serial No. 716,696.

Figure 2:
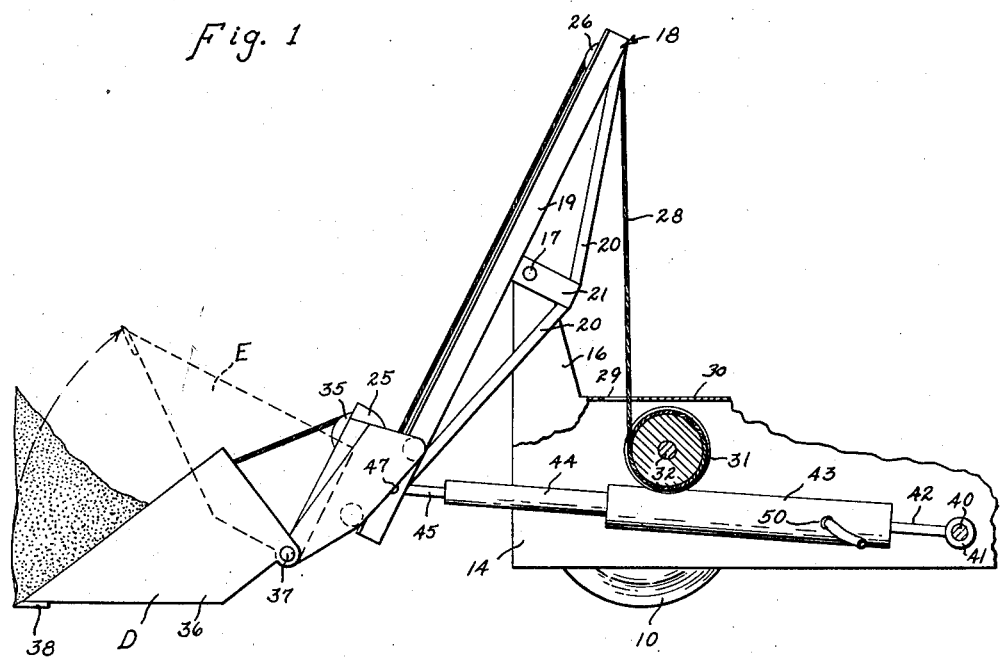
Fig. 2 is a view similar to Fig. 1 showing the scoop in full lines at the termination of a scooping movement and in broken lines when in a material holding position.
Figure 3:
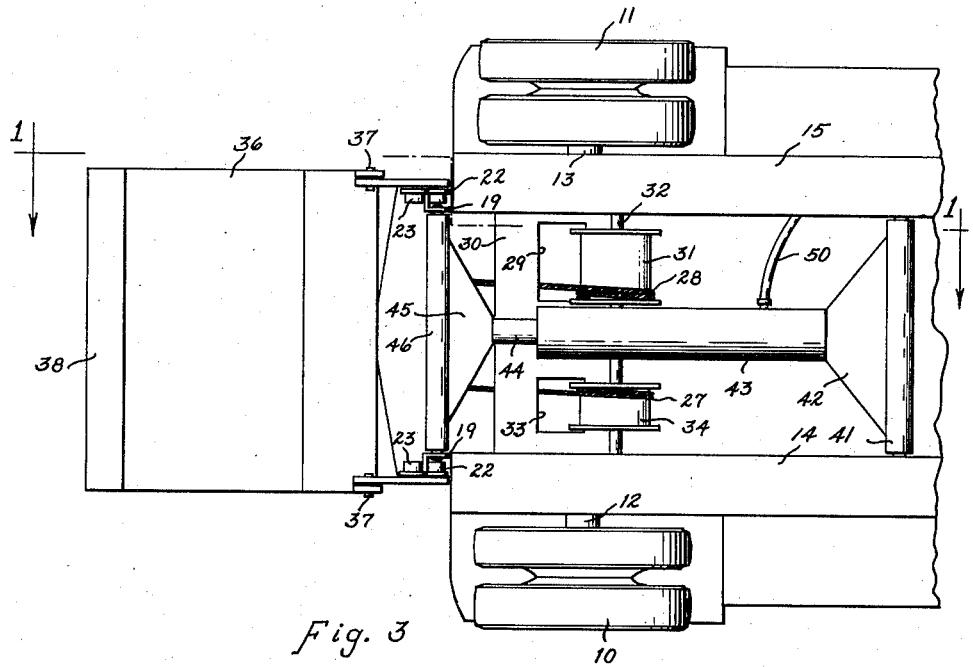
Fig. 3 is a bottom view looking upward beneath the automotive vehicle of Fig. 1.
Figure 4:
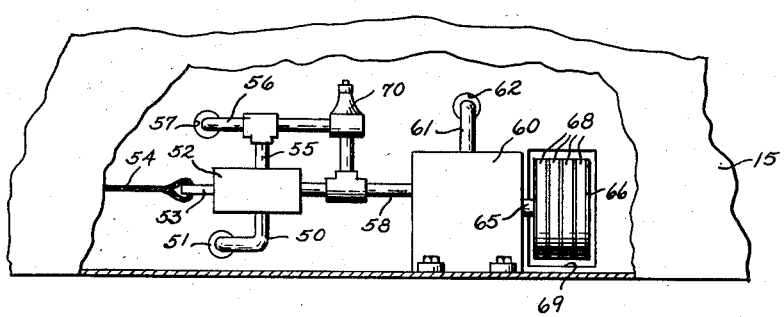
Fig. 4 is a partialy broken-away view of a side of the vehicle of Fig. 1 showing control means for the hydraulic scoop pushing mechanism.

Figs. 1 and 2 illustrate an important advantage of the present invention. In Fig. 1 it will be seen that when the scoop is in position C the carriage 25 is somewhat above the lower end of the frame 18. When the piston 44 is extended the distance between pulley 26 and drum 31 decreases, thereby permitting an increase in the distance between pulley 26 and carriage 25. If cable 28 is held against movement when the scoop is at position C no further manipulation of the scoop or carriage is required to permit the scoop to move into the pile of material while the cutting edge 38 moves in a substantially linear path closely adjacent the ground, rather than in an arcuate path as would be the case with prior art devices.

It is likewise to be appreciated that the scoop may be moved to position D whereupon the cable 54 may be manipulated to permit drainage of the cylinder 43, but due to the resistance of the ground against the partially loaded scoop the frame 18 may remain in extended position until the vehicle is driven forward. When the vehicle has been driven forward the cylinder 43 may be again subjected to pressure to assure full loading of the scoop.

It may also be seen that the scoop may be caused to travel through an arcuate path by taking up the cable 28 while the piston 44 is being extended, and that the scoop may operate to dig a cut in a steep bank by winding in the cable 28 with or without extension of piston 44, and with or without forward movement of the vehicle.

The modification disclosed in Figs. 5 to 8 inclusive comprises a vehicle including a single rear steering wheel 80 and spaced pairs of forward driving wheels 81 which are driven by floating axles enclosed in an axle and differential housing 82 into which extends the propeller shaft 83 extending forwardly from the engine 84. A driver's cab 85 is mounted at one forward corner of the vehicle over one of the front sets of wheels 81 so that the occupant thereof may have clear view toward the front of the vehicle and into the scoop or other device carried by the vehicle. Suitable controls for operating the vehicle and the material handling device are provided within the cab 85, such controls not being herein illustrated. A pair of vertical posts 86 mounted at the front corners of the chassis of the vehicle extend upward and support an upper fixed section of track 87 at each corner of the vehicle. Braces 88 and 89 extend rearwardly from the bottom and top of the track sections 87 to the top of a vertical post 90 and a downwardly extending brace 91. Suitable cross members such as the angle bar 92 may be extended between the frames thus provided at each side edge of the vehicle to form a sturdy support for the upper track sections 87.

The track sections 87 are so mounted as to have their forward flanges in a vertical plane extending forwardly of the front edge of the chassis. The lower ends of the track sections 87 are rounded and support pivot pins 93 at the center of curvature of the round ends. Lower swinging track sections 94 depend from the pivot pins 93 and are provided with round concave ends to match the convex ends of the upper track sections. The track sections 87 and 94 may be of any suitable shape such as the T-bars herein illustrated, the leg of the T extending rearwardly to provide flanges for attaching the ends of cross bars such as bars 95 (Fig. 6) whereby a swinging frame pivoted at a point spaced above the chassis is provided. The arms of the T-bars lie in the same plane and provide guiding surfaces for upper, rear carriage wheels 96 and lower, front carriage wheels 97 mounted upon the side plates 98 of a carriage 99. The inwardly extending arms of the T-bars provide guides for a pair of guiding wheels 100 projecting rearwardly from the rear surface of the carriage 99 so as to prevent binding of the carriage at any position along the swinging frame or the fixed track sections.

The carriage 99 is provided with pintles 105 at its front lower corners upon which may be mounted a scoop 106 or other material handling device. The carriage 99 is provided with guiding pulleys such as the pulley 107 about which extends a cable 108 having its forward end attached to the upper rear edge of the scoop 106. The cable 108 extends about a cable guiding pulley 110 mounted adjacent the upper ends of the fixed track sections 87 and from there extends downwardly to a drum 111. The drum 111 may be operated to control the position of the carriage vertically of the track and the relative position of the scoop to the carriage as explained in the aforesaid application, Serial No. 716,696. The cable 108 is preferably passed about a second guiding pulley 112 mounted at the junction of the brace 88 and post 86, but such second guiding pulley may be eliminated if desired. In order that the cable 108 may be slacked off to permit movement of the scoop to dumping position while the carriage 99 is held at any height above the ground a carriage braking cable 113 is fixed to the rear surface of the carriage 99, extends upward over a pulley (not shown) coaxial with the pulley 110, and from there extends to a carriage braking drum 114 coaxial with the scoop control drum 111.

In order that the frame provided by tracks 94 may be swung outwardly to cause the scoop to enter into piled materials the lower end of each track section 94 is pivotally attached to the outer end of a long rack 120 having teeth on its upper edge. The inner end of each rack is maintained in engagement with a pinion 121 mounted at the lower end of a swinging support including spaced plates 122 and 123. The rack is held in contact with the gear 121 by a support 124 pivotally mounted upon the axle of the gear 121 and carrying cross bars 125 upon which may be mounted rollers (not shown) for engaging the bottom surface of the rack 120. The upper ends of the plates 122 and 123 are pivotally mounted upon a cross shaft 126 suitably journaled in the chassis of the vehicle. The gear 121 is driven when desired by a sprocket chain 130 passing about a sprocket on shaft 126 and a sprocket 131 fixed to the shaft of gear 121. The shaft 126 is driven by a sprocket chain 132 passing about a sprocket 133 on shaft 126 and a sprocket 134 extending laterally from a reduction gear box 135. The reduction gear box includes gears driven by any suitable connection to the engine 84, such as belts connected to the crank shaft extension which mounts the pulley for driving the water pump and fan (not shown). The shaft 136 may be intermittently connected to the gears in reduction gear box 135 by any suitable control means such as a clutch 137 schematically indicated. Details of means for connecting the reduction gears to the engine when desired are thought to be unnecessary for an understanding of the present invention. Details of suitable means which may be modified or adapted for the purpose may be ascertained from the aforementioned application, Serial No. 756,224. The reduction gears may be driven by other means or the shaft 126 may be rotated by other means and still have the construction remain within the purview of the present invention.

The supporting plates 123 are provided with forwardly directed extensions to which are pivotally attached the upper ends of substantially vertical links 140 which extend downwardly between vertical flanges 141 rising from substantially horizontal grouser plates 142, the links 140 being pivotally attached to the flanges 141 at 143. A pair of abutment pins 144 extend between the flanges and are spaced from the lower end edges of the link 140 to prevent more than a limited swinging movement of the grouser plate. The grouser plate is preferably provided with a plurality of depending teeth or cleats 145 adapted to be driven into the ground when the grouser plate is lowered into contact with the ground. A substantially horizontal link 146 is pivoted to the grouser plate 142 and to a bracket 147 mounted on the chassis of the vehicle. A heavy coil spring 150 is tensioned between the upper end of each link 140 and the track support, preferably adjacent the junction of post 86 and bar 88.

The lower extremities of the arms of the T-bars 94 are preferably directed rearwardly as indicated at 151 (Fig. 8) for a purpose to be described.

Figure 5:
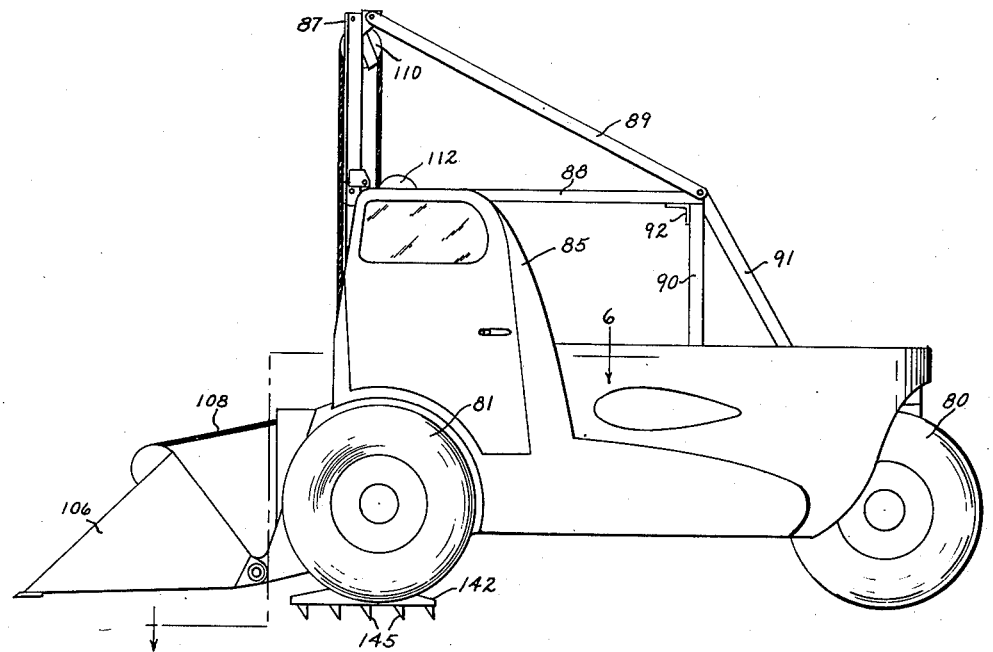
Fig. 5 is a side view of a modified form of vehicle incorporating a modified form of the invention.
Figure 6:
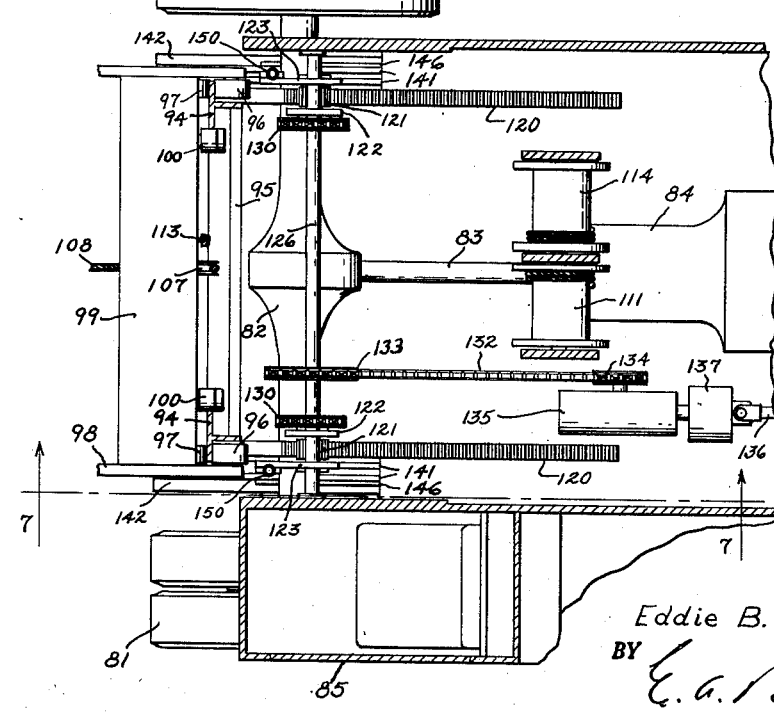
Fig. 6 is a partial view on an enlarged scale taken substantially along the section line 6—6 of Fig. 5.

The operation of this form of the invention is as follows: With the swinging frame in line with the upper track sections as seen in Fig. 7 the carriage 99 may be lowered until the pintles 105 are closely adjacent the ground. The braking drum 114 may be locked and the control drum 111 released so that the weight of the scoop 106 causes it to fall forward into contact with the ground as seen in Fig. 7. Thereupon the pinion gears 121 may be driven with the first result that the swinging supports therefor will swing rearwardly as the resistance of the pile of material and the weight of the scoop and track sections tend to hold the scoop stationary. The swinging of the support causes downward movement of vertical links 140 to drive the grousers into contact with the ground as seen in Fig. 5. When further movement of the grousers is impossible continued movement of the pinions 121 results in the racks 120 being extended forwardly to drive the scoop into the material as seen in full line in Fig. 8. It will be noted that the lower carriage wheels 97 have ridden down onto the rearwardly directed portions 151 of the T-bars, thus permitting the carriage to cant and thus causing the cutting edge of the scoop to remain more closely adjacent the surface of the ground than would otherwise be possible. The movement of the cutting edge is therefore not along an arc centered at pivot 93, but along a curve more closely approaching linear movement. The downward movement of the carriage is permitted since the distance between the upper end of the carriage and the pulley 110 shortens as the frame swings outwardly. If desired the pinions 121 may now be unclutched and the vehicle driven forward and the scoop may remain in extended position or may drop back toward the vehicle. In either event the first movement of the pinions 121 in the reverse direction may result in the grousers being lifted from the ground due to the force of the springs 150. Also the cleats 145 are preferably directed rearwardly or are provided with sloping front faces so that forward movement of the vehicle may be accomplished without interference from the grousers. Whenever the operator sees that the scoop is completely filled he may reverse the driving pinions 121 to cause the swinging frame to align itself with the fixed track sections 87 and while so doing, or before or afterwards, may wind up the cable 108. The cable 108 is wound up to lift the scoop to the material carrying position seen in dash lines in Fig. 8. Continued winding of the cable 108 on drum 111 while the racks 120 are being retracted, or before or after they have been retracted, will result in lifting the scoop to any desired height within the limits of the machine. The material may then be carried to any remote point by driving the vehicle with the carriage held in elevated position. At such a remote point the drum 111 may be released while the braking drum 114 is held in locked position, with the result that the scoop swings to dumping position by the effect of gravity. As in the previous modification a vertical bank may be operated upon while swinging the tracks 94 outwardly and moving the scoop from its lowered position to its upright position, or by leaving the scoop in upright position and swinging the tracks 94. The vehicle may be used as a bulldozer by driving the vehicle forwardly while the swinging frame remains vertical.

As in the previous modifications other forms of material handling device such as hay forks, material handling frames or concrete buckets may be substituted for the scoop herein illustrated by removing the pintles 105 and replacing the material handling device.

Having illustrated and described preferred embodiments of the invention it will be apparent to those skilled in the art that further modifications in detail and arrangement thereof are permissible. For example, the scoop herein illustrated may be replaced by a hay fork or other form of material handling device. Also other forms of extensible means may be substituted for the hydraulic cylinder or the rack herein disclosed. All such modifications as come within the true spirit and scope of the appended claims are considered to be a part of my invention.

I claim:

1. An automotive vehicle comprising a pivoted frame normally occupying a substantially vertical position and having its lower end adapted to swing toward and away from the front end of the vehicle, a material handling device mounted on said frame and adapted to assume a position adjacent the lower end of said frame, a rack pivotally attached to the lower end of said frame and extending therefrom into said vehicle, a swinging support slidably guiding said rack, a driven gear carried by said support and maintained in mesh with said rack, a substantially vertical link depending from said support, a grouser supported by said link, and means to drive said gear, the foregoing construction causing rotation of said gear in one direction initially to swing said support and lower said grouser into contact with the ground and thereafter to advance said rack and move said device forwardly.

2. The construction set forth in claim 1 in combination with a second substantially horizontal link pivoted to said grouser and to said vehicle.

3. The construction set forth in claim 1 in combination with a spring tensioned between said grouser and said vehicle to raise said grouser during reverse rotation of said gear.

4. The construction set forth in claim 1 in which said gear driving means comprises a first sprocket coaxial with said gear, a second sprocket coaxial with the axis of rotation of said support, and a sprocket chain passing around said sprockets.

5. The construction set forth in claim 1 in which a rack guide is pivotally mounted on said support coaxially with said gear.

6. The construction set forth in claim 1 in which said gear driving means comprises an angularly displaceable drive.

7. An automotive scoop comprising a wheeled vehicle including a chassis, a vertically extending, rockable frame pivoted at its upper end to said vehicle, a scoop or the like mounted on said frame, an extensible pusher between the chassis of the vehicle and the lower end of said frame for rocking said frame to push said scoop or the like into materials on the ground, a grouser movable into contact with the ground to anchor the vehicle against backward movement when said scoop or the like encounters resisting materials, and motive means common to said grouser and said pusher, said motive means including means operative first to lower said grouser into engagement with the ground and then to extend said pusher.

EDDIE B. WAGNER.

REFERENCES CITED

The following references are of record in the file of this patent:

UNITED STATES PATENTS

| Number | Name | Date |
|---|---|---|
| 1,386,911 | Thomas | Aug. 9, 1921 |
| 1,753,731 | Abbe | Apr. 8, 1930 |
| 1,926,308 | Pierce | Sept. 12, 1933 |
| 2,109,388 | Heller | Feb. 22, 1938 |
| 2,354,337 | Smith | July 25, 1944 |
| 2,387,764 | Maxwell | Oct. 30, 1945 |
| 2,421,472 | Way | June 3, 1947 |
| 2,437,010 | Way | Mar. 2, 1948 |
| 2,439,139 | Le Tourneau | Apr. 6, 1948 |
| 2,462,790 | Van Voorhis | Feb. 22, 1949 |
| 2,478,462 | Decker | Aug. 9, 1949 |